(12) United States Patent
Willis

(10) Patent No.: US 7,110,634 B2
(45) Date of Patent: Sep. 19, 2006

(54) OPTIC SWITCHING MECHANISM

(75) Inventor: Chris L Willis, Hollis, NH (US)

(73) Assignee: Bae Systems Information and Electronic Systems Integration INC, Nashua, NH (US)

( * ) Notice: Subject to any disclaimer, the term of this patent is extended or adjusted under 35 U.S.C. 154(b) by 107 days.

(21) Appl. No.: 10/612,548

(22) Filed: Jul. 2, 2003

(65) Prior Publication Data

US 2005/0002598 A1 Jan. 6, 2005

(51) Int. Cl.
G02B 6/26 (2006.01)

(52) U.S. Cl. .......................................... 385/18; 385/16

(58) Field of Classification Search ............ 385/16–18, 385/25; 359/196–226
See application file for complete search history.

(56) References Cited

U.S. PATENT DOCUMENTS

| | | | | |
|---|---|---|---|---|
| 2,394,283 A | * | 2/1946 | Yost | .......................... 200/80 R |
| 3,700,313 A | | 10/1972 | Karr et al. | |
| 3,814,365 A | | 6/1974 | Mackenzie | |
| 3,885,205 A | * | 5/1975 | Helmer | ........................ 388/816 |
| 3,897,139 A | | 7/1975 | Caruolo et al. | |
| 3,966,309 A | | 6/1976 | Mohler | |
| 4,687,287 A | | 8/1987 | Lukas et al. | |
| 4,738,506 A | * | 4/1988 | Abendschein et al. | ......... 385/19 |
| 4,869,583 A | | 9/1989 | Tiedje | |
| 4,893,899 A | | 1/1990 | Huckenbeck | |
| 5,019,837 A | | 5/1991 | Schwarz | |
| 5,177,644 A | | 1/1993 | Stark | |
| 5,239,599 A | * | 8/1993 | Harman | ......................... 385/16 |
| 5,483,608 A | * | 1/1996 | Yokomachi et al. | ........... 385/22 |
| 5,757,561 A | | 5/1998 | Sechrist et al. | |
| 5,923,798 A | * | 7/1999 | Aksyuk et al. | ................ 385/19 |
| 5,930,057 A | | 7/1999 | Sechrist et al. | |
| 6,016,230 A | | 1/2000 | Nunnally et al. | |
| 6,198,580 B1 | | 3/2001 | Dallakian | |
| 6,208,777 B1 | * | 3/2001 | Jing | ............................. 385/16 |
| 6,297,898 B1 | * | 10/2001 | Tanijiri et al. | ............... 359/224 |
| 6,304,393 B1 | | 10/2001 | Sechrist et al. | |
| 6,359,731 B1 | * | 3/2002 | Koyama | ...................... 359/381 |

(Continued)

OTHER PUBLICATIONS

Griffith, Peter et al, Optical Mounts: Ignore The at Your Peril, Photonics Spectra, Sep. 1998, Laurin Publishing Co., Inc.
Newport Corporation, Application Note Opto-Mechanics 2, Fast Steering Mirror Technology: Active Beam Stabilization, Newport Corporation, 2001, Irvine, CA.

(Continued)

*Primary Examiner*—Ellen E. Kim
(74) *Attorney, Agent, or Firm*—Maine & Asmus

(57) ABSTRACT

Techniques for switching an optical element from one path to another, where each path has high dimensional stability in a harsh thermal and dynamic environment, are disclosed. In one particular embodiment, the optic is mounted on a rotable platform. A spring mechanism preloads the platform against a hard stop, thereby providing accurate and repeatable placement of the optic in its deployed position. The motor's actuator arm is the only element whose position is sensed, allowing the switching system to work without requiring highly precise position feedback. In the stowed position, the spring mechanism operates as a firm tension cable, thereby securing the optic out of the laser beam path.

21 Claims, 8 Drawing Sheets

U.S. PATENT DOCUMENTS

| | | | |
|---|---|---|---|
| 6,459,845 B1* | 10/2002 | Lee et al. | 385/140 |
| 6,480,347 B1 | 11/2002 | Spring | |
| 6,526,198 B1* | 2/2003 | Wu et al. | 385/18 |
| 6,606,429 B1* | 8/2003 | Carberry et al. | 385/23 |
| 2002/0172450 A1* | 11/2002 | Yang | 385/16 |

OTHER PUBLICATIONS

Newport Corporation, Opto-Mechanics, MFM Series—Flexure Industrial Optical Mounts (products catalog), pp. 610-611, Newport Corporation, Irvine, CA.

* cited by examiner

OPTIC SWITCHING MECHANISM

FIELD OF THE INVENTION

The invention relates to optic switching, and more particularly, to a laser beam switching mechanism for carrying out beam re-directing.

BACKGROUND OF THE INVENTION

Lasers are employed in a number of applications, including both commercial and military applications. In general, lasers provide a highly precise mechanism to communicate information (e.g., control signals or targeting information) from one point to another. The distance between the points may be a short distance (e.g., closed box applications) or a great distance (e.g., laser guided targeting applications). Optics are used in conjunction with the laser, so as to control the path which the laser beam follows. Thus, precision aiming of the laser beam is enabled.

In many applications, controlling the laser beam so that it remains on its intended path is not trivial, particularly those applications where the laser system is subjected to harsh thermal and dynamic environments. The slightest deviation from the desired beam path can render a laser system unreliable for its intended purpose. The optics must therefore operate to continuously adjust to ensure beam accuracy. In addition, where the laser beam is switchable between two or more paths, the switching scheme must be highly repeatable (e.g., within one milliradian) so as to prevent inconsistencies associated with the paths.

There are a number of existing mechanisms that enable highly repeatable laser switching schemes, such as stepper driven or motion controlled brushless DC driven single axis stages, over-center toggle mechanisms driven by snap action solenoids, low backlash driven mechanisms using highly accurate feedback from a sensor such as an optical encoder or Eddy current sensor, or a single axis linear stepper motor for directly positioning the optic on a moving platen (armature). Each of these mechanisms is associated with a number of disadvantages.

For example, stepper motors and motion controlled brushless DC motors require considerable electronic and mechanical hardware to control motion. Such motor based schemes are typically appropriate when controlled contouring motion is required, but are overkill for point to point applications where low cost, small size, and low complexity are required. In addition, these methods allow sensing of the motor axis motion, which when performed, still requires a close to zero backlash connection between the motor and optic, thereby increasing cost and complexity.

Since small solenoids cannot be continuously energized without direct cooling, solenoid driven mechanisms used in small systems in harsh environments usually involve push-pull arrangements requiring two coils, coupled to an over-center toggle mechanism. Alternatively, there are two solenoids, with one for actuating and the other for locking the device. This is often acceptable when the device being moved is of extremely low mass. However, if the object has a relatively large mass, then the solenoid driven mechanism must be of sufficient size to accomplish placement and holding. Furthermore, such a solenoid driven mechanism employs "snap action" by definition. Oftentimes, however, no dashpot or other damping mechanism is allowed due to cleanliness requirements in the optical compartment.

Optical encoders are typically big and expensive. In addition, an appropriate encoder for closed box applications associated with high mass devices would be linear, and would sense the actual optic (or its mount) position. In harsh environments, maintaining optic/mount in a precise position may be difficult or untenable. An Eddy current sensor would sufficiently sense final position of the optic or mount, but such sensors are extremely expensive. Moreover, a scheme would have to be devised to hold the position of the optic in a harsh thermal and dynamic environment. Linear steppers are also expensive, and require separate motion control apparatus.

What is needed, therefore, are low cost and complexity techniques for causing a laser beam, to switch from one path to another, where each path has high dimensional stability in a harsh thermal and dynamic environment.

BRIEF SUMMARY OF THE INVENTION

One embodiment of the present invention provides an optic switching system for moving an optic element between a stowed and deployed position. The system includes an optic platform that pivots about an axis of rotation, and has a range of motion that includes a first position (e.g., stowed position) and a second position (e.g., deployed position). A hard stop is located proximate the platform, thereby defining the one of the positions (e.g. deployed position). A push/pull spring operatively couples the platform to a motor assembly, and is adapted to preload the platform against the hard stop, thereby holding the platform in the stopped position despite opposing forces. Such a system can be used to switch a laser beam from one path to another, by deploying an optic mounted on the platform into the beam path.

The motor assembly may include, for example, an actuator arm coupled to the shaft of the motor, wherein the push/pull spring floatably couples about a pin in the actuator arm. The system may further include a process controller that is communicatively coupled with the motor for commanding deployed and stowed positioning. The process controller can be programmed or otherwise configures to provide position commands to the motor. In addition, the process controller can be adapted to receive sense signals indicating the position of the motor's actuator.

In one particular embodiment, the platform further includes a stop interface that is adapted to mate with the hard stop, wherein the stop interface is made of a material that is harder than the material of which the platform is made. Such a configuration provides a durable stop (e.g., hardened steel), but allows the bulk of the system to be fabricated from materials having lower mass (e.g., aluminum). The stop interface can have, for example, a semi-circular shape that seats into a v-groove of the hard stop, thereby defining a two point kinematic contact. In an alternative embodiment, the hard stop is provided by a motion limiting ball and groove configuration.

A pivot can be operatively coupled to the platform thereby defining the axis of rotation. The pivot can be configured for providing both frictionless bearing and rotational spring resistance during motion. In such an embodiment, the rotational spring resistance provided by the pivot operates in conjunction with the push/pull spring and the motor to provide positional stability. In one particular application, the motor is a low speed, high torque motor that is internally geared down (e.g., greater than 500 to 1). The push/pull spring can be fabricated, for example, from a strip of thin stainless steel having dimensions that operate in conjunction with torque capability of the motor to provide a desired preload force for holding the platform in the deployed position.

Note that, in response to a stow command, the motor can be continuously driven so as to provide a constant pull torque on the push/pull spring, thereby maintaining the platform in the stowed position. The system may further include one or more limit switches that are adapted to indicate actuator arm position, thereby allowing for a known preload force to be applied in maintaining at least one of the deployed and stowed positions.

Another embodiment of the present invention provides a method for switching an optic between stowed and deployed positions, wherein the optic is mounted on a pivotable platform that can swing between stowed and deployed positions under the control of a motor operatively coupled to the platform by a push/pull spring. The method includes commanding deployment of the optic, pushing the optic platform into the deployed position with the push/pull spring, and preloading the platform against a hard stop, thereby holding the platform in the deployed position despite opposing forces. In response to receiving a request for the stowed position, the method may further include commanding non-deployment of the optic, and pulling the optic platform into the stowed position using the push/pull spring.

The method may further include sensing when the platform is sufficiently stowed. In one such embodiment, sensing when the platform is sufficiently stowed includes sensing when an actuator arm of the motor is in a position associated with the stowed position. Pulling the optic platform into the stowed position using the push/pull spring includes, for example, at least one of preloading the platform against a hard stop defining the stowed position, and pulling the platform at a predefined torque. The method may further include sensing when the preloading of the platform against the hard stop is at a predefined force. Here, sensing when the preloading of the platform against the hard stop is at a predefined force may include sensing when an actuator arm of the motor is in a position associated with the predefined force.

Another embodiment of the present invention provides a push/pull spring for operatively coupling a rotable optic platform to a motor assembly, thereby allowing the optic platform to be preloaded against a desired position. The push/pull spring includes an elongated strip of material having spring like and flexible qualities, and further having dimensions and a modulus of elasticity associated with torque capability of a motor with which the push/pull spring is intended to operate. The strip material may further be corrosion resistant if so desired.

A clip is adapted to couple around the strip, thereby forming the strip into an open-ended loop and enabling the spring like and flexible qualities of the strip to push and preloaded the platform against a stop so as to hold the platform against the stop despite opposing forces. One end of the strip is adapted to operatively couple with the motor assembly, and the other end of the strip is adapted to operatively couple with the optic platform.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Embodiments of the present invention provide low cost and complexity techniques for causing a laser beam, to switch from one path to another, where each path has high dimensional stability in a harsh thermal and dynamic environment. The switching scheme is compact and can fit into relatively confined spaces, and does not require precision feedback to perform positioning of optical elements to within one milliradian of desired positions.

The present invention can be employed in a number of laser switching applications, including laser switching applications inside a closed box having an area of limited space and predefined shape. High dimensional stability is maintained despite harsh environmental conditions. In one particular switching system embodiment, an optic is mounted on a rotable platform. A spring mechanism preloads the optic's platform against a hard stop, thereby providing accurate and repeatable placement of the optic in its deployed position. The motor shaft/actuator arm is the only element whose position is sensed, allowing the switching system to work without requiring highly precise position feedback. In the stowed position, the spring mechanism operates as a firm tension cable, thereby securing the optic out of the laser beam path.

Optic Switching System Architecture

Figure 1A:
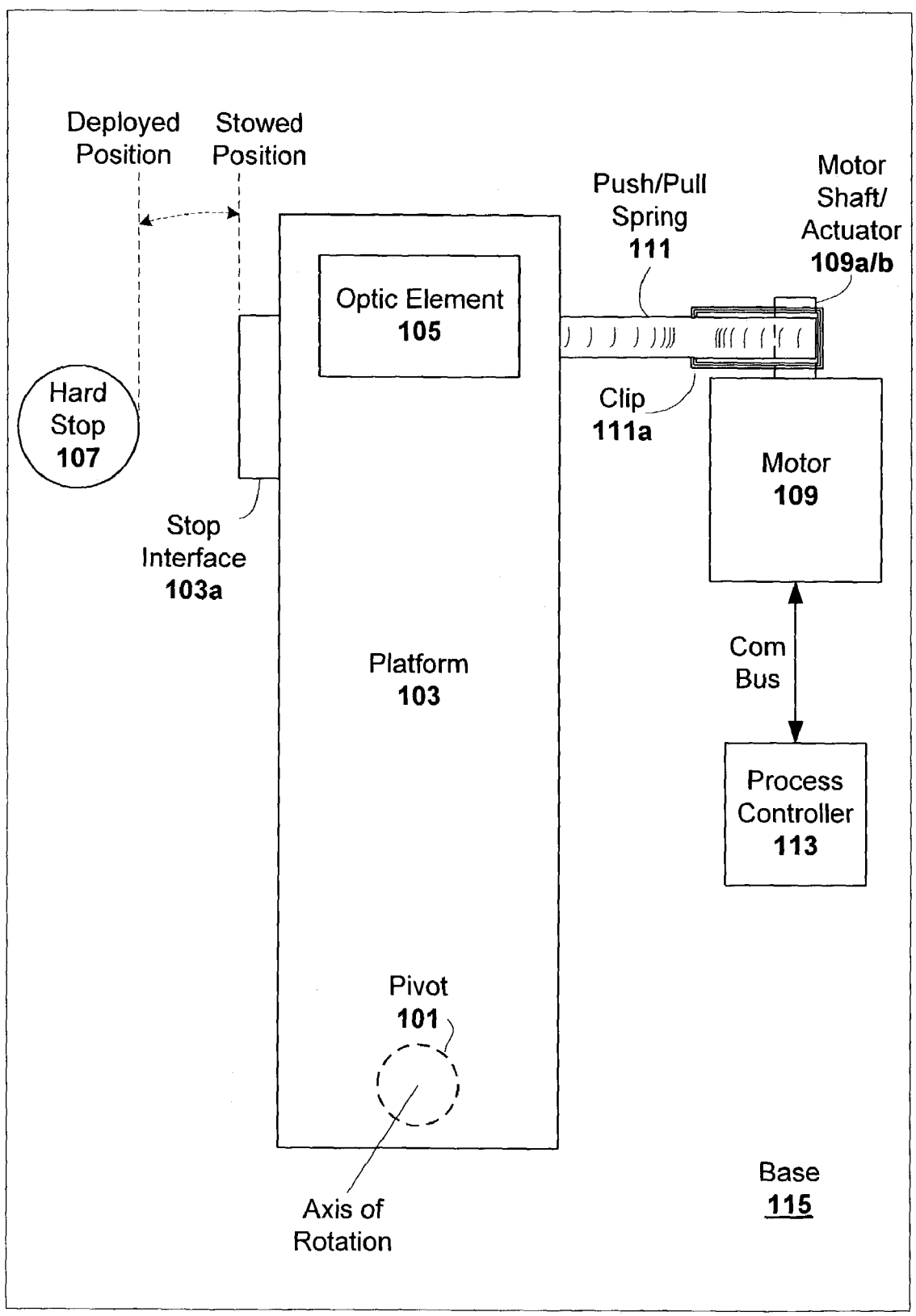
FIGS. 1a–b illustrate top and end view block diagrams, respectively, of an optic switching system configured in accordance with one embodiment of the present invention.
Figure 1B:
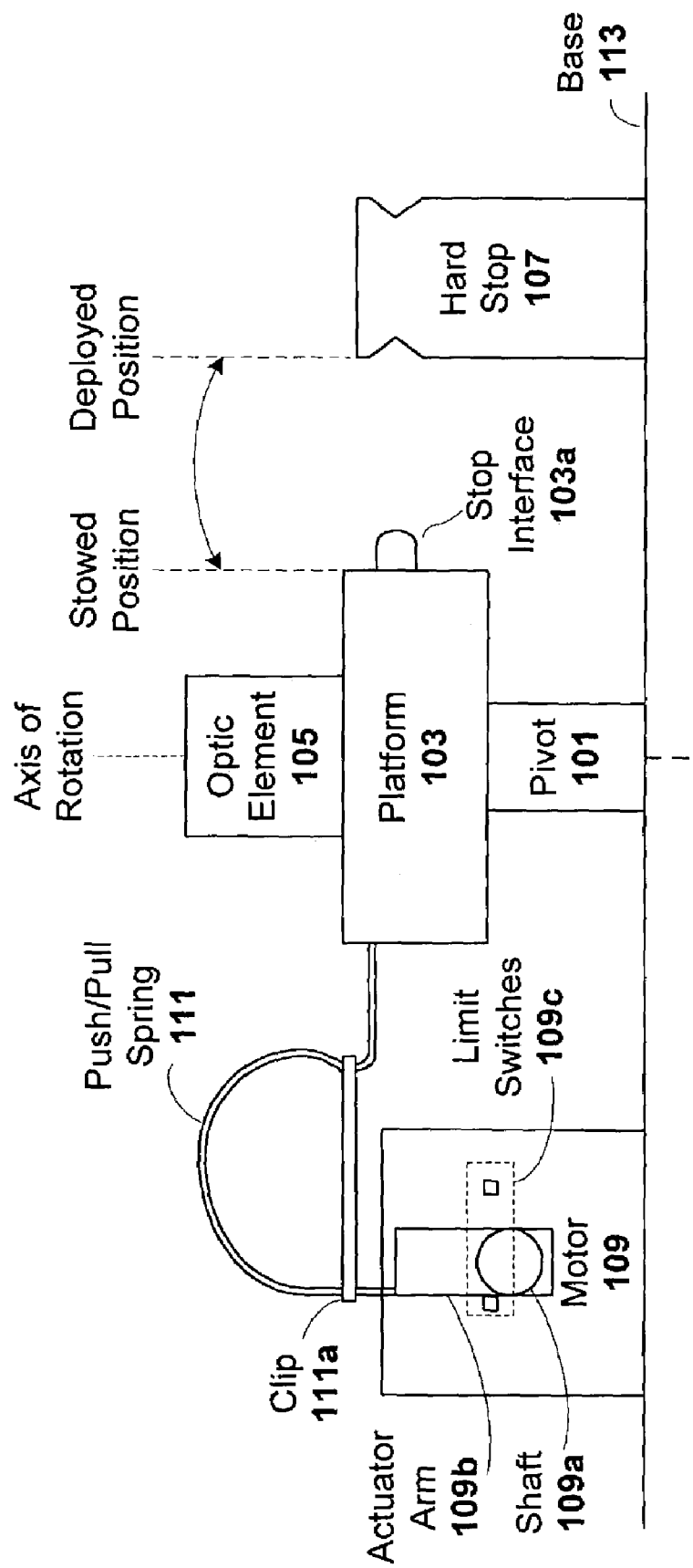

FIG. 1a illustrates a top view block diagram of an optic switching system configured in accordance with one embodiment of the present invention, while FIG. 1b illustrates an end view (looking into the motor shaft) of the same embodiment.

The system includes a platform 103 that swings about an axis of rotation by virtue of a pivot 101. An optic element 105 is mounted on the platform 103. A stop interface 103a on the side of the platform 103 is adapted to mate with a hard stop 107. The platform 103 is operatively coupled to a motor 109 by a push/pull spring 111. In particular, the push/pull spring 111 is coupled to an actuator arm 109b, which is fixed to the motor shaft 109a. A clip 111a is coupled about the push/pull spring 111 material. As can be seen, the system has a range of motion, and can swing between a stowed position to a deployed position. A process controller 113 is provided, which is communicatively coupled with the motor 109 via a bus.

The system is mounted on a base 115, which could be, for example, a surface of a closed box. However, numerous other mounting schemes may be used here as well. In addition, the system may include other components not shown in the figure, such as laser generator circuitry, filters, additional optic elements, control electronics, power electronics, and mechanical limit or reed switches for measuring or otherwise sensing the incremental position of the motor shaft/actuator. A limit switching scheme is shown in FIG. 1b, and will be discussed in turn.

The pivot 101 allows the platform to rotate, and may be, for example, a Bendix flex pivot. Such a pivot is a commonly used device, providing both frictionless bearing and rotational spring resistance during motion. Other rotational mechanisms can be used here as well. For example, a torsion spring and axle pin in a precision hole could be used. However, more particulate matter may be generated during use. The type of rotational mechanism employed here thus depends on factors such as cleanliness of operation and desired rotational resistance.

The optic element 105 can be, for example, a total internal reflection (TIR) prism deflecting the beam 90°. The optic element 105 could alternatively be, for instance, a mirror, polarizer, or other suitable optic. One benefit associated with a TIR prism is that it lends itself to be easily bonded or otherwise fixed in place (e.g., via an optical mount or a suitable adhesive given the particulars of the application).

The push/pull spring 111 effectively couples the motor's shaft/actuator arm 109a/b to the platform 103. Clip 111a is coupled around the push/pull spring 111 material, so as to allow the spring 111 to operate as a spring plunger in compression for one direction, and an inflexible rope in tension for the opposite direction. In particular, the spring quality of the push/pull spring 111 allows the platform 103 to be compressed to a known preload condition in its deployed position against the hard stop 107. In the opposite direction, the push/pull spring 111 allows the platform 103 to be pulled and held firmly in its stowed position.

The push/pull spring 111 can be fabricated, for example, from a strip of thin stainless steel or other corrosion resistant strip material having spring like and flexible qualities (e.g., beryllium copper). The dimensions and material type of the spring 111 will depend on the particulars of the application, including the desired preload force, the torque capability of motor 109, and the range of motion between the deployed and stowed positions.

Generally, as the thickness of the spring 111 material increases, the force exerted by the spring 111 increases. Likewise, as the force exerted by the spring 111 increases, the torque requirement of the motor 109 increases. Further note that the thickness of the material from which spring 111 is fabricated will vary depending upon the modulus of elasticity associated with that material. In one particular application (having similar dimensions and materials to those described herein, the force exerted by the spring 111 is sufficient to preload the platform against the hard stop 107 while under 40 G loading. Other preloading schemes can be used here as well, and the force exerted by the spring 111 will vary with each application.

The clip 111a effectively snaps over the spring 111 material, and operates to keep the spring 111 material formed in an open-ended or omega (Ω) shaped loop, thereby providing the spring-like quality of the push/pull spring 111. In addition, the clip 111a operates to provide consistency in the push/pull spring 111 performance, by keeping the applied force in a single plane. Note that when the platform 103 is preloaded into the hard stop 107, the clip 111a goes slack around the push/pull spring 111 loop. Such slack is not problematic, as the clip 111a is generally of inconsequential mass relative to the other componentry of the system.

In the stowed position, the resistive spring force provided by a flex pivot 101 can be used in conjunction with the push/pull spring 111 and motor/actuator assembly to provide positional stability. Note, however, that in the stowed position, the optic need only be out of the beam path, and no precise position is required. In the deployed position, precise position is provided by contact between the stop interface 103a bonded into or on the side of the platform 103 making contact with the hard stop 107. The hard stop 107 effectively operates as a cam, and provides initial adjustment in the axis of rotation about the flex pivot 101. In this sense, the hard stop 107 can be positioned as necessary to provide a known range of rotation.

In one particular embodiment, the stop interface 103a is semi-circular shaped and seats into a v-groove of hard stop 107 as shown in FIG. 1b. Thus, a two point kinematic contact is provided. In addition, this grooved interface provides some restriction to motion up and down the axis of rotation, which might otherwise occur due to vibration. The hard stop 107 and stop interface 103a meet each other with there axes orthogonal to one another. Both the hard stop 107 and the interface 103a can be made of, for example, hardened steel for durability. Thus, while the hard stop 107 the interface 103a enable a precise and repeatable deployment position (e.g., within ±/−1 milliradian), the push/pull spring 111 and motor/actuator assembly (including motor 109, shaft 109a, and actuator arm 109b) operate to maintain that position despite any opposing forces (e.g., vibration, G-forces).

Numerous variations on the precise and repeatable stop scheme are possible and the present invention is not intended to be limited to any one configuration. An alternative to the hard stop 107 and stop interface 103a embodiment could be, for example, a motion limiting ball and groove configuration. Here, the motion limiting ball can be mounted under the platform 103. The underside of the platform 103 would have a groove allowing the ball to roll back and forth, with a corresponding groove in the base 115, thereby defining a range of platform movement. The opposite ends of each ball groove would effectively provide a robust ball stop, thereby enabling a precise and repeatable position of deployment.

The motor 109 can be a conventional motor or servo having a shaft or other actuating assembly that can be used to move the platform 103 between its stowed and deployed positions. In one particular embodiment, motor 109 is a low speed, high torque motor that is internally geared down (e.g., 1/1000). Such a high gear ratio will generally provide slow and gentle actuation, thereby reducing wear-and-tear on the stopping mechanism in the deployment position. The particulars of the motor 109 (e.g., planetary gear head, torque, speed, size, mass) will depend upon factors such as the mass that is moved between the stowed and deployed positions, which generally includes the optic 105 and the platform 103.

The process controller 113 can be implemented, for example, as a programmable microcontroller that includes a central processing module, one or more executable process modules, memory, input/output (I/O) ports, and other relevant supporting functionality. Other suitable processing environments can be used here as well. The process controller 113 can, for example, output position commands to motor 109, as well as receive sense signals from the limit switches 109c. Note that the process controller 113 can be integrated into the motor 109.

The process controller 113 can further be adapted to carry out other functionality as will be apparent in light of this disclosure. For example, the process controller 113 can be configured with a system monitoring routine, which effectively monitors the optic switch system for mechanical wear-and-tear by comparing actual position and/or movement distance data to known calibrated values of such parameters. Comparisons that yield an out-of-spec parameter value can be used to identify possible mechanical degradation (e.g., in the stop interface), and to signal the need for system maintenance or recalibration.

In one particular embodiment, the process controller 113 is programmed or otherwise configured with a position control process module, which operates to command the platform to its stowed or deployed positions. The position command can be generated internally by the control processor 113 (e.g., based on a timed algorithm). Alternatively, the position command can be based on input received from a host or subsystem with which the optic switching system is operating in conjunction.

In either of the stowed and deployed positions, the motor 109 can be continuously driven so as to provide a constant push or pull torque on the spring 111. Thus, in the deployed position, the motor 109 would be commanded to continuously push the spring 111 into the platform (forcibly holding or "preloading" the platform 103 against the stop 107). A stow command would cause the motor 109 to continuously rotate in the opposite direction, thereby pulling the platform 103 out of the optic path, and holding the platform there until otherwise commanded.

In the illustrated embodiment, motor 109 receives command signals from the process controller 113 over the corn bus. This causes the motor shaft to rotate, which in turn causes the actuator arm 109*b* to move. As the actuator arm 109*b* rotates (into the platform 103), the push/pull spring 111 pushes the platform into the hard stop 107. In this sense, the push/pull spring 111 compresses against the platform 103, thereby preloading the platform 103 against the hard stop 107. The target position of the actuator arm 109*b* may be based on empirical data. For instance, the process controller 113 can command the motor 109 to rotate 35 degrees to robustly preload the platform 103 in the deployed position. Likewise, the target position of the actuator arm 109*b* may be based on calibration data.

Alternatively, the target position of the actuator arm 109*b* may be based on the status of limit switches 109*c*. In this case, the limit switches 109*c* effectively provide real-time feedback so that the motor 109 is simply driven until the limit switch (or switches) 109*c* associated with the desired actuator position is triggered. The process controller 113 can read the statuses of the limit switches 109*c* (e.g., over the corn bus), and can drive or otherwise command the motor 109 accordingly. Such a limit switch scheme allows for a known preload force to be applied in maintaining the deployed position. Note that multiple limit switches could be used to indicate multiple actuator 109*b* positions, each associated with a known preload force.

In one particular embodiment, a magnet is located in or on the actuator arm 109*b* so as to effectively define a magnetic pathway. Here, the switches 109*c* are implemented with reed switches positioned along that magnetic pathway for sensing the position of the actuator arm 109*b*. In another embodiment, each switch 109*c* could be implemented with a contact switch having two conductive pads spaced adjacent to one another, with one being a reference pad and the other being a contact pad. As the actuator arm 109*b* moves to effect a position (e.g., stowed or deployed), it physically pushes the reference pad into the contact pad, thereby generating a signal. That signal can then be provided to or otherwise monitored by the process controller 113.

Note that, as the actuator arm 109*b* is the only element whose position is sensed, the switching system operates without complex feedback circuitry. Further note that, by sensing the actuator 109*b* position (as opposed to the platform position), the motor 109 can be made to continually apply torque to the spring 111, even when the deployed position is met. This allows a known preload force to be achieved, and the maintaining of a precise deployed position. Numerous other actuator position sensing schemes are possible here as will be apparent in light of this disclosure.

Implementation Details

Figure 2A:
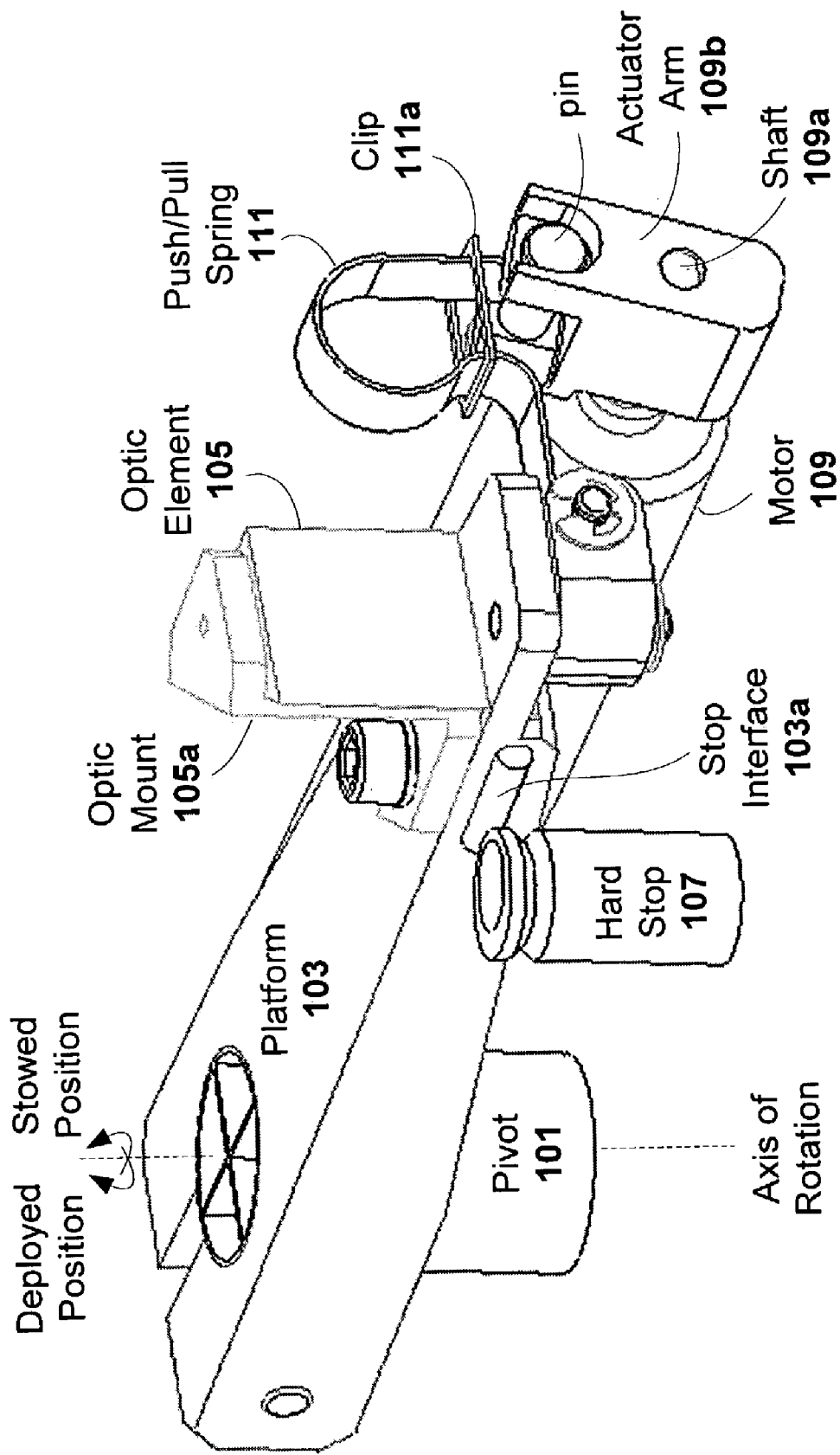
FIGS. 2a–e each illustrate a detailed perspective diagram of an optic switching system configured in accordance with one embodiment of the present invention.
Figure 2B:
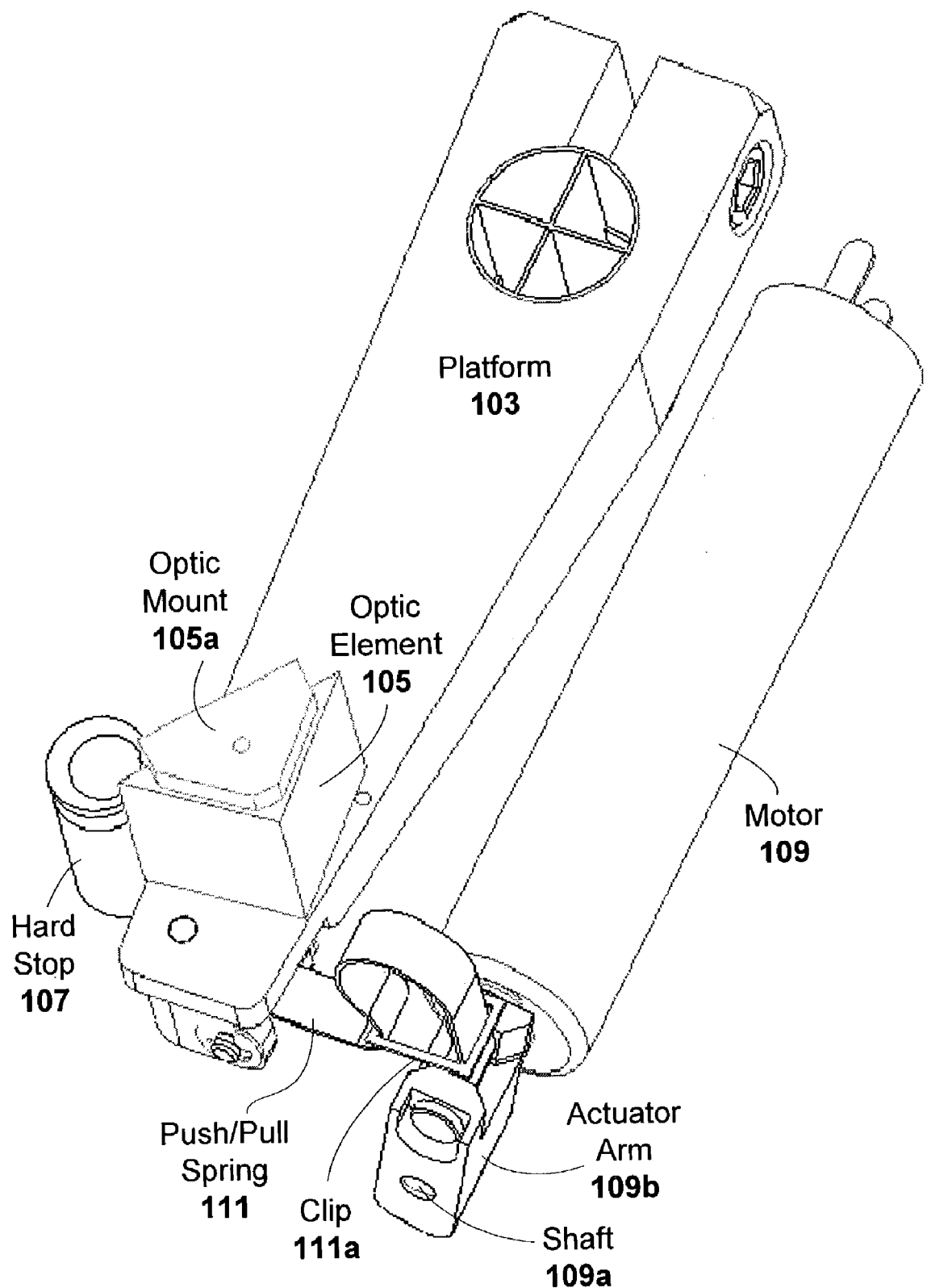
Figure 2C:
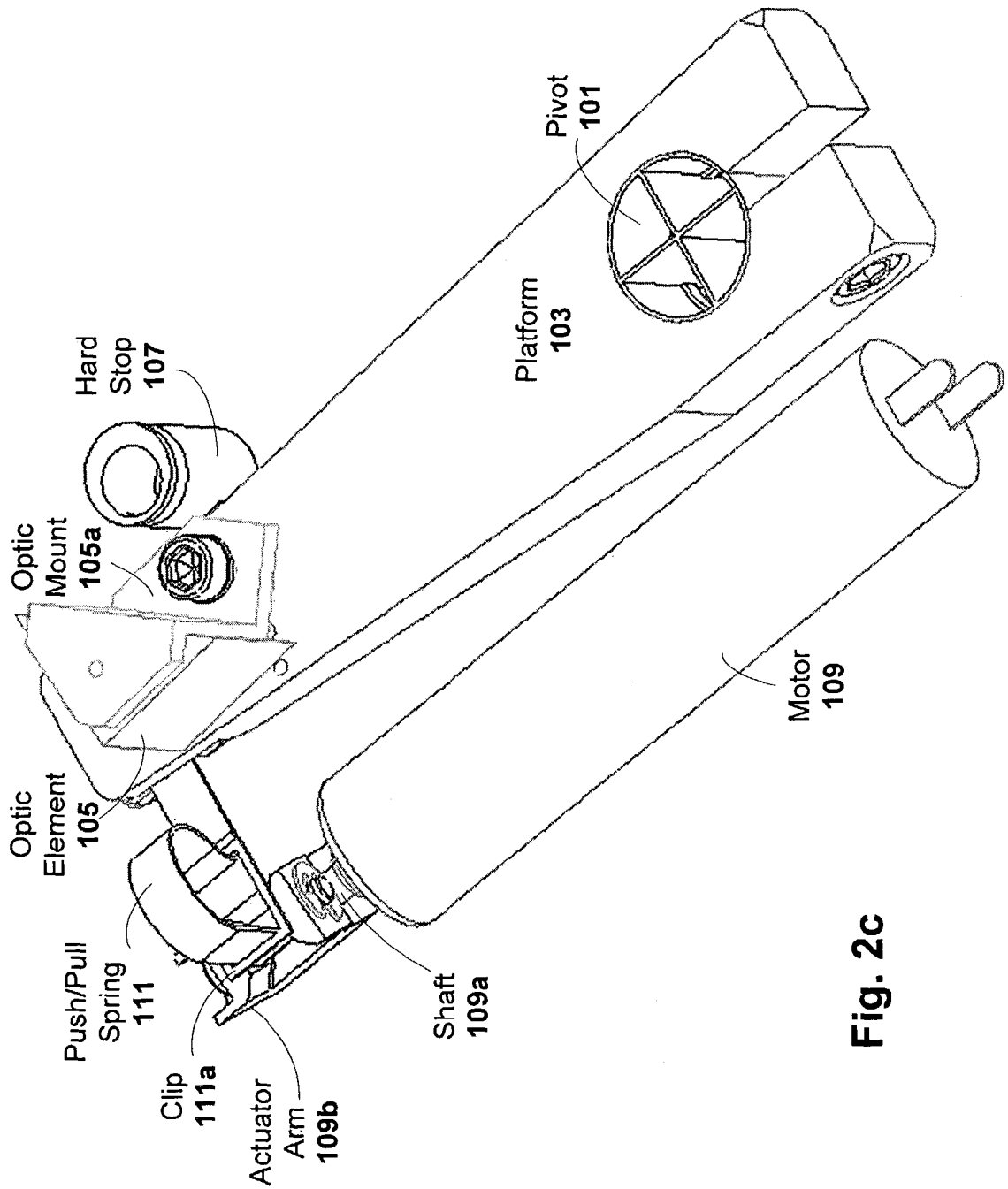

FIGS. 2*a*–*e* each illustrate a detailed perspective diagram of an optic switching system configured in accordance with one embodiment of the present invention. As can be seen, FIGS. 2*a*, 2*b*, and 2*c* show particular examples for components previously discussed in reference to FIGS. 1*a* and *b*. Thus, the relevant sections of the previous explanations will equally apply here. Note, however, that numerous such detailed configurations will be apparent in light of this disclosure, and the present invention is not intended to be limited to any one such embodiment.

Here, the optic element 105 is mounted to the platform 103 using a mount 105*a* (e.g., aluminum or durable plastic). The optic 105 can be secured to the mount 105, which is secured to the platform 103. Conventional bonding agents (epoxies) or fasteners (screws, bolts), for example, can be used to secure each component in place. The platform 103 further includes a slotted hole that is adapted to snugly receive the pivot 101. A fastening mechanism crosses through the slotted end of the platform and is tightened to secure the platform 103 about the pivot 101.

Figure 2D:
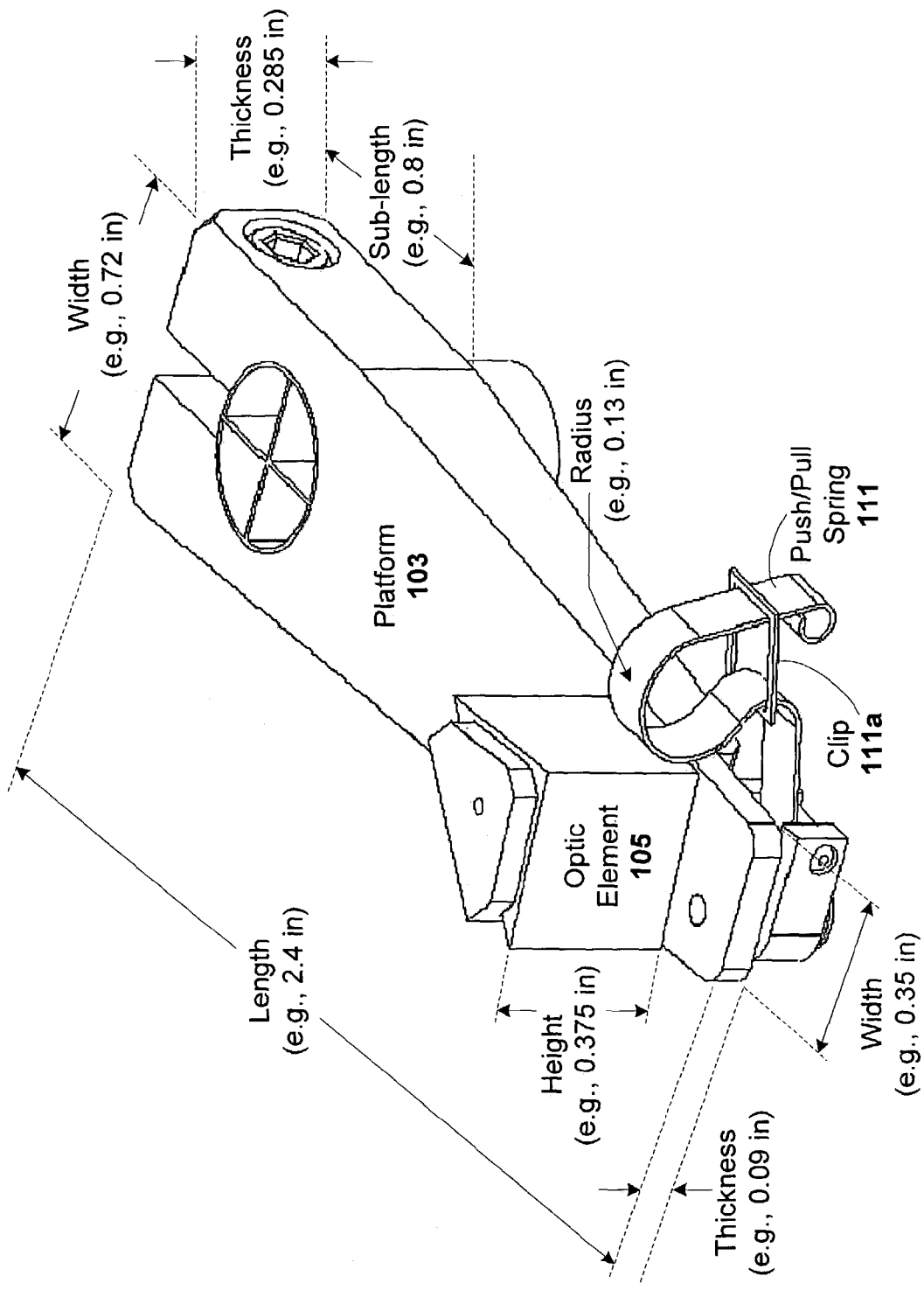

FIG. 2*d* shows example dimensions for one particular embodiment of the switching system. Of course, the dimensions of the switching system will vary depending on the application. Here, the platform 103 can be made, for example, from a relatively light weight material such as aluminum or durable plastic, and has a length of about 2.4 inches. Note that the platform 103 tapers in both width and thickness. At the pivot 101 end, the width is about 0.72 inches and the thickness is about 0.285 inches. The flat portion (where the pivot 101 is secured) extends about 0.8 inches, and then begins to taper upward (on the underside of the platform) as shown. The optic end of the platform 103 is about 0.35 inches wide and about 0.09 inches thick. As can be seen in FIG. 2*d*, the upward tapering continues until platform step 103*b*. This step is about 0.9 inches tall. This tapered platform and step configuration operate to reduce the mass of the optic end of the platform 103, which in turn reduces the torque requirement of the motor 109. The platform step 103*b* also allows for a flat spot where the platform spring interface 103*c* is connected (e.g., bolted).

The optic element 105 in this embodiment is a total internal reflection (TIR) prism for deflecting the beam 90° when deployed. The right angle sides of the optic 105 are each about 0.375 inches square, with the hypotenuse side having the same height and slightly longer in accordance with Pythagoras's theorem. The push/pull spring 111 is a strip of stainless steel that is about 1.68 inches long, about 0.125 inches wide, and about 0.012 inches thick. The push/pull spring material is formed into a loop having a radius of about 0.13 inches, using clip 111*a* (e.g., same material as spring 111 material or durable plastic). The dimensions of the clip 111*a* are such that is snaps over a loop of the spring 111 material and substantially holds the desired loop radius.

Figure 2E:
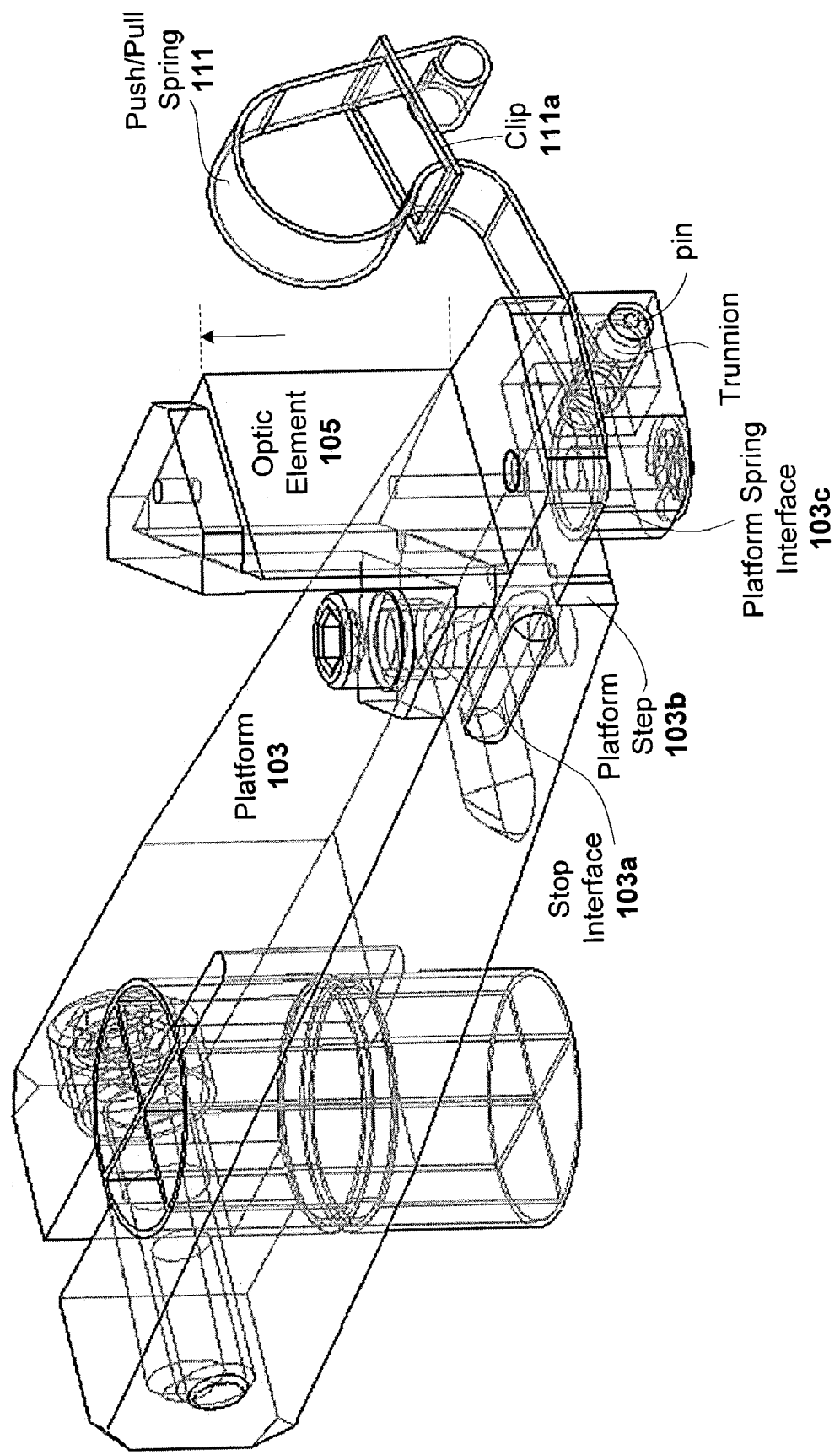

The ends of the spring 111 are curled. One curled end operatively couples to a pin in the actuator arm 109*b* (FIG. 2*a*). This curled end floats about the pin to provide a degree of freedom (e.g., about 1°). Note that this curled end could also be fixed to the motor shaft 109*a*. Here, no actuator arm is needed, but note that such a constrained coupling may be inappropriate for some applications. In this sense, how the spring 111 is coupled to the motor depends on the motor assembly configuration and the desired system performance. The other curled end operatively couples to a trunnion in the platform spring interface 103c (FIG. 2e). This curled end floats about the trunnion, which floats about a pin (FIG. 2e). Thus, a first degree of freedom is provided about the trunnion (e.g., about 1°), and a second degree of freedom is provided about the pin (e.g., about 1°). The degrees of freedom prevent over constraint conditions accounting for motion of both the actuator arm 109b and the platform 103.

Methodology

Figure 3:
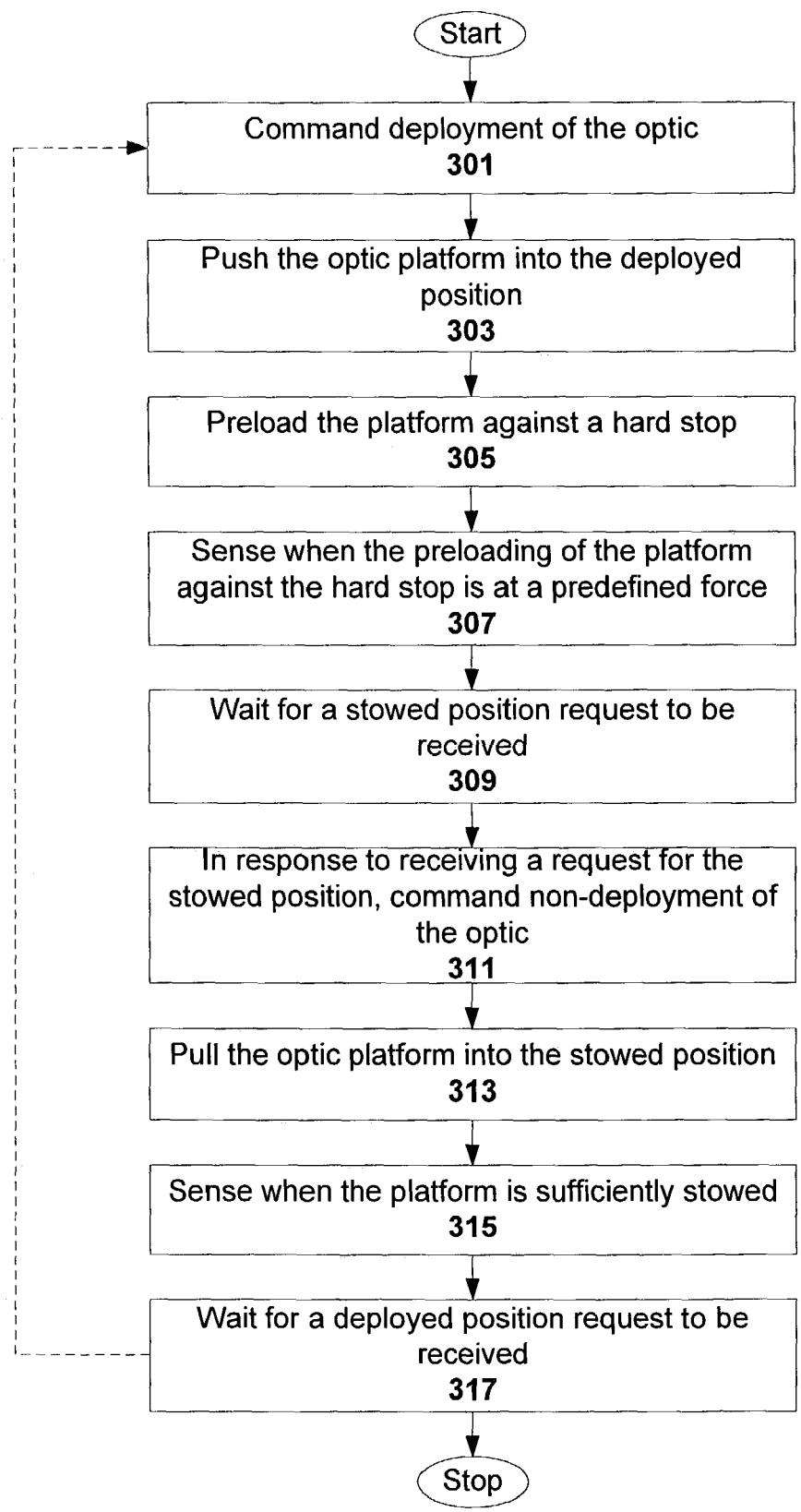
FIG. 3 illustrates a method for switching an optic between stowed and deployed positions in accordance with one embodiment of the present invention.

FIG. 3 illustrates a method for switching an optic between stowed and deployed positions in accordance with one embodiment of the present invention. The method can be carried out, for example, by the optic switching system illustrated in FIGS. 1a–b or FIGS. 2a–e. The optic is mounted on a pivotable platform that can swing between stowed and deployed positions under the control of a motor. Assume that the optic is initially in its stowed position.

The method begins with commanding 301 deployment of the optic. This can be carried out, for instance, by generating a deployment signal with a programmable process controller, and applying that deployment signal to a motor operatively coupled to the optic platform. The method proceeds with pushing 303 the optic platform into the deployed position, and preloading 305 the platform against a hard stop. This can be carried out by the push/pull spring as described herein, which operatively couples the motor to the platform. The preloading operates to hold the platform in the deployed position despite opposing forces (e.g., vibrations and G-forces).

The method may further include sensing 307 when the preloading of the platform against the hard stop is at a predefined force. This can be carried out, for instance, by using one or more limit switches to sense an actuator arm position that is associated with the predefined force. In this sense, the motor can be continuously driven so as to provide a torque associated with the desired preloading. Note that the optic can be maintained in its deployed position, under the predefined force, until a stowed position request is received. Thus, the method may further include waiting 309 for a stowed position request to be received.

In response to receiving a request for the stowed position, the method further includes commanding 311 non-deployment of the optic. This can be carried out, for instance, by generating a stow signal with the programmable process controller, and applying that stow signal to the motor operatively coupled to the optic platform. The method then proceeds with pulling 313 the optic platform into the stowed position. This can be carried out by the push/pull spring as described herein. The method may further include sensing 315 when the platform is sufficiently stowed. This can be carried out, for instance, by using one or more limit switches to sense an actuator arm position that is associated with the stowed position. In this sense, the motor can be continuously driven so as to provide a torque associated with sufficient stowing (e.g., so long as the optic remains out of the optical path).

Note that the stowing of the optic may include preloading the platform against a second hard stop (defining the stowed position). Alternatively, the stowing of the optic includes pulling the platform at a predefined torque. Further note that the optic can be maintained in its stowed position, sufficiently out of the optical path, until a deployed position request is received. Thus, the method may further include waiting 317 for a deployed position request to be received. In response to receiving such a request, the method can proceed as described at 301.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An optic switching system for moving an optic element between a stowed and deployed position, the system comprising:
    a platform that pivots about an axis of rotation, and having a range of motion that includes a stowed position and a deployed position;
    an optic element operatively coupled to the platform;
    a hard stop proximate the platform, thereby defining the deployed position;
    a motor having an actuator arm coupled to its shaft;
    a push/pull spring operatively coupling the platform to the actuator arm of the motor, and adapted to preload the platform against the hard stop, thereby holding the platform in the deployed position despite opposing forces; and
    a process controller communicatively coupled with the motor for commanding deployed and stowed positioning.

2. The system of claim 1 wherein the platform further includes a stop interface that is adapted to mate with the hard stop, wherein the stop interface is made of a material that is harder than the material of which the platform is made.

3. The system of claim 1 wherein a pivot is operatively coupled to the platform thereby defining the axis of rotation, the pivot providing both frictionless bearing and rotational spring resistance during motion.

4. The system of claim 3 wherein the rotational spring resistance provided by the pivot operates in conjunction with the push/pull spring and the motor to provide positional stability.

5. The system of claim 1 wherein the optic element is a total internal reflection (TIR) prism adapted to deflect a laser beam 90°.

6. The system of claim 1 wherein the push/pull spring is fabricated from a strip of thin stainless steel having dimensions that operate in conjunction with torque capability of the motor to provide a desired preload force for holding the platform in the deployed position.

7. The system of claim 1 wherein the platform further includes a stop interface that is adapted to mate with the hard stop, the stop interface having a semi-circular shape that seats into a v-groove of the hard stop, thereby defining a two point kinematic contact.

8. The system of claim 1 wherein the hard stop is provided by a motion limiting ball and groove configuration.

9. The system of claim 1 wherein the motor is a low speed, high torque motor that is internally geared down.

10. The system of claim 1 wherein the process controller provides position commands to the motor, and receives sense signals indicating the position of the motor's actuator.

11. The system of claim 1 wherein in response to a stow command, the motor is continuously driven so as to provide a constant pull torque on the push/pull spring, thereby maintaining the platform in the stowed position.

12. The system of claim 1 further comprising:
    one or more limit switches adapted to indicate actuator arm position, thereby allowing for a known preload force to be applied in maintaining at least one of the deployed and stowed positions.

13. An optic switching system for moving an optic element between stowed and deployed positions, the system comprising:
an optic platform that rotationally pivots about an axis of rotation of a pivot point, and having a range of motion that includes a first position and a second position;
a hard stop proximate the platform, thereby defining the first position; a motor assembly having an actuator arm operatively coupled to its shaft; and
a push/pull spring operatively coupling the platform to the actuator arm of the motor assembly, and adapted to preload the platform against the hard stop, thereby holding the platform in the first position despite opposing forces, wherein the motor assembly rotates and provides a push/pull torque that drives the push/pull spring to push/pull the platform.

14. The optic switching system of claim 13 wherein the push/pull spring comprises:
an elongated strip of material having spring like and flexible qualities, and further having dimensions and a modulus of elasticity associated with torque capability of the motor assembly; and
a clip adapted to couple around the strip, Thereby forming the strip into an open-ended loop and enabling the spring like and flexible qualities of the strip to push and preload the platform against the hard stop;
wherein one end of the strip is operatively coupled with the motor assembly, and the other end of the strip is operatively coupled with the optic platform.

15. A method for switching an optic between stowed and deployed positions, wherein the optic is mounted on a pivotable platform that can swing between stowed and deployed positions under the control of a motor operatively coupled to the platform by a push/pull spring, the method comprising:
commending deployment of the optic;
rotating a shaft of the motor, wherein said shaft is coupled to the push/pull spring;
pushing the optic platform into the deployed position with the push/pull spring, wherein the motor rotation provides a push/pull torque that drives the push/pull spring to push/pull the platform, and wherein said platform rotationally pivots about an axis of rotation; and
preloading the platform against a hard stop, thereby holding the platform in the deployed position despite opposing forces.

16. The method of claim 15 further comprising:
in response to receiving a request for the stowed position, commanding non-deployment of the optic; and
pulling the optic platform into the stowed position using the push/pull spring.

17. The method of claim 16 further comprising:
sensing when the platform is sufficiently stowed.

18. The method of claim 17 wherein sensing when the platform is sufficiently stowed includes sensing when an actuator arm of the motor is in a position associated with the stowed position.

19. The method of claim 16 wherein pulling the optic platform into the stowed position using the push/pull spring includes at least one of preloading the platform against a hard stop defining the stowed position, and pulling the platform at a predefined torque.

20. The method of claim 15 further comprising:
sensing when the preloading of the platform against the hard stop is at a predefined force.

21. The method of claim 20 wherein sensing when the preloading of the platform against the hard stop is at a predefined force includes sensing when an actuator arm of the motor is in a position associated with the predefined force.

* * * * *